April 14, 1925.

G. L. E. KLINGBEIL

SPRING SPREADER

Filed March 17, 1924

Inventor
G. L. E. Klingbeil,
By Samuel Herrick,
Attorney

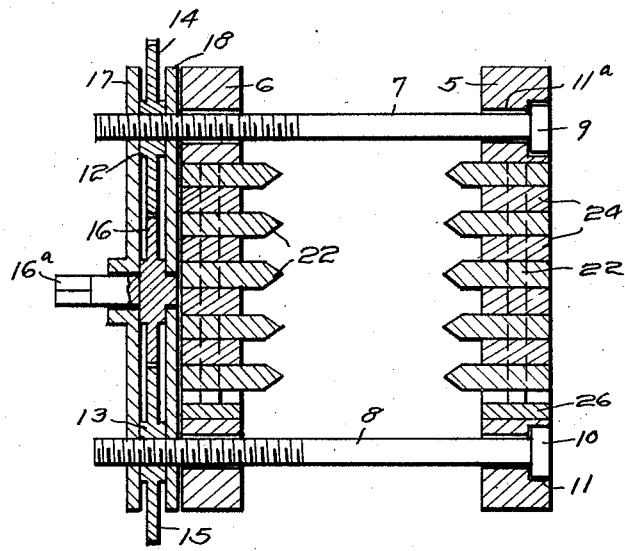
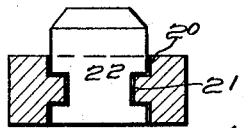
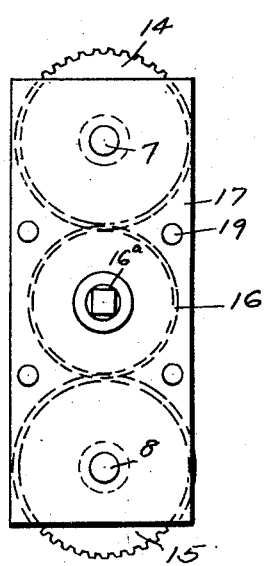
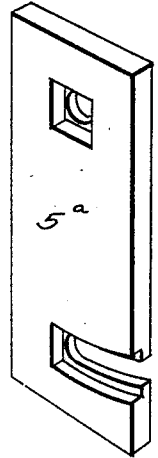

April 14, 1925.

G. L. E. KLINGBEIL 1,533,993

SPRING SPREADER

Filed March 17, 1924

Inventor
G. L. E. Klingbeil,
By Samuel Herrick,
Attorney.

Patented Apr. 14, 1925.

1,533,993

UNITED STATES PATENT OFFICE.

GOTTLIEB L. E. KLINGBEIL, OF OMAHA, NEBRASKA, ASSIGNOR TO CENTRAL TRADING COMPANY, OF DOVER, DELAWARE.

SPRING SPREADER.

Application filed March 17, 1924. Serial No. 699,756.

*To all whom it may concern:*

Be it known that GOTTLIEB L. E. KLINGBEIL, citizen of the United States, of Omaha, Nebraska, residing at Omaha, in the county of Douglas and State of Nebraska, has invented certain new and useful Improvements in Spring Spreaders, of which the following is a specification.

This invention relates to spring spreaders for use in separating the leaves of vehicle springs, and more particularly for use in separating the leaves of the springs of automobiles to permit of the insertion of lubricant therebetween. It is a primary object of the invention to provide a device of the character indicated which will be of simple and inexpensive construction, may be easily handled and will sufficiently serve the end sought, even though used upon cars of varying make, having springs of varying width and with leaves of varying thickness.

Further objects and advantages of the invention will be set forth in the detailed description which follows.

In the accompanying drawing:

Fig. 5 is a vertical sectional view.

Fig. 6 is a view from the other end of the spring spreader.

Fig. 7 is a sectional view through one of the wedge carrying blocks.

Fig. 8 is a perspective view of a substitute cap plate hereinafter described.

Like numerals designate corresponding parts in all of the figures of the drawings.

Figure 1:
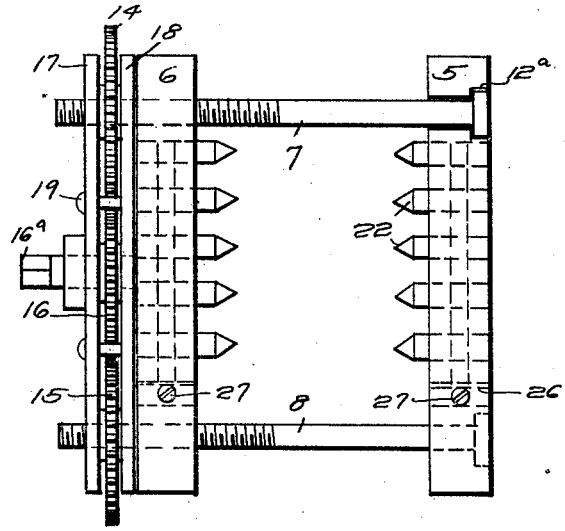
Fig. 1 is a perspective view of a spring spreader constructed in accordance with the invention.
Figure 2:
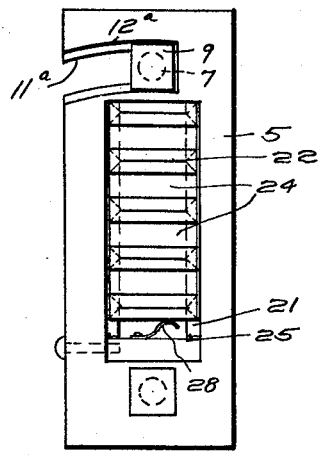
Fig. 2 is a view from one end thereof.

The spring spreader of the present invention comprises wedge carrying blocks 5 and 6. Bolts 7 and 8 are threaded throughout the major portions of their length and are provided with angular heads 9 and 10. The angular head 10 of the bolt 8 is adapted to have a seating in an angular recess 11 formed in the block 5, whereby the bolt is held against turning with relation to the said block. The other end of the block 5 is provided with an arcuate slot $11^a$, the inner portion of which is of a size to receive the bolt 7 and the outer portion of which is somewhat wider and receives the angular head 9 of the bolt 7, the latter portion of the slot being designated $12^a$. By virtue of this construction the block may be swung out of engagement with the bolt 7 during the time that the device is being engaged about a spring and yet when the block is swung into engagement with the bolt 7, said bolt will be held against turning with relation to said block.

The block 6 is free to slide along the bolts 7 and 8, and is forced along said bolts and toward the block 5 by means of nuts 12 and 13 which constitute the hubs of gear wheels 14 and 15. Motion is imparted to these wheels by a pinion 16 meshing with both of them, said pinion being integral with an angular shank $16^a$ to which a socket wrench, or other tool, may be applied for the purpose of imparting rotation to the pinion and consequently imparting movement to the gear wheels and travel to block 6. Pinion 16 and gear wheels 14 and 15 are mounted between plates 17 and 18. The whole unit consisting of said plates, pinions, and gear wheels move together as a unit forcing the block 6 toward block 5, the plates being held in proper relation to each other by studs 19. Each of the wedge carrying blocks 5 and 6 has an elongated opening 20 formed therethrough. Ribs 21 project inwardly from the sides of said opening and extend nearly the full length of said opening, but terminate a little short of one end of said opening.

Figure 3:
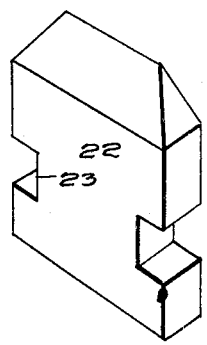
Fig. 3 is a perspective view of one of the wedges hereinafter described.
Figure 4:
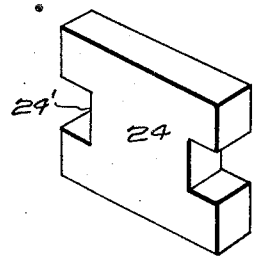
Fig. 4 is a perspective view of one of the shims hereinafter described.

These ribs slidably receive the wedges 22. These wedges are best illustrated in Fig. 3 and it will be noted that they have notches 23, formed in their edges, which notches receive the ribs 21. Shims 24 have notches 24' formed in their edges for the reception of the ribs. By using shims of various thicknesses the wedges may be spaced apart the proper distance to enter between the leaves of springs, even though the leaves of one spring may be thicker than the leaves of another spring. The wedges and shims are mounted upon the ribs 21 by slipping them into place through the space 25 left at one end of the ribs, and after the several wedges and shims have been placed in position, the space is closed by inserting a filling plate 26 therein, said plate being held in place by a screw 27. If desired a light leaf spring 28 may be interposed between the banks of wedges and one end of the openings 20, whereby the banks of wedges as a whole will be floatingly mounted, and thus be adapted to seek that position with relation to the leaves of the spring being operated upon, where they may function most efficiently.

In Fig. 8 I have illustrated a substitute cap plate 5ᵃ, which may be used in lieu of the block 5 where the space between the side of the spring and the body of the automobile is not sufficient to permit of the insertion of the relatively thick block 5. In such case as that the thin plate 5ᵃ is substituted for the block 5 and the wedges carried by the block 6, are relied upon, alone, to spread the leaves of the spring.

In operation the block 6 is retracted or moved away from the block 5 the desired distance by turning the shank 16ᵃ of the pinion 16. Then the block 5 is swung with bolt 8 as its pivot to disengage slot 11 from bolt 7. After the device has been fitted over a spring the block 5 is swung back to the position illustrated in Fig. 1 and the shank 15ᵃ is turned by means of a socket wrench or other tool to rotate the nuts 12 and 13 and to move the block 6 forcibly toward block 5. This results in forcing the banks of wedges in between the leaves of the spring and separates said leaves enough so that lubricant may be inserted therebetween.

It is a well known fact that most of the squeak and much of the hard riding of automobiles is due to the lack of efficient lubrication of the leaves of the spring. These objectionable features may be readily cured by the use of the tool illustrated and described herein.

Figure 13:
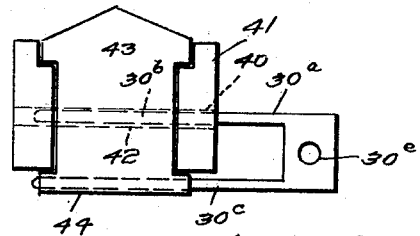
Fig. 13 is a view like Fig. 11 but illustrating a modified form of shim and wedge.
Figure 14:
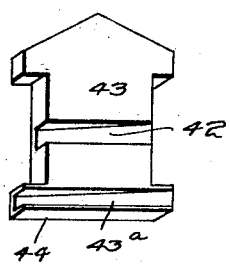
Fig. 14 is a perspective view of the wedge used in conjunction with the structure of Fig. 13.
Figure 15:
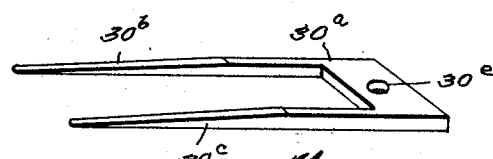
Fig. 15 is a perspective view of the wedge shim used in conjunction with Fig. 13.

In Figs. 9 to 15 I have illustrated simultaneously adjustable shims 30, 30ᵃ. The shims 30 are of tapered or wedge shape and are provided with openings 31 in their outer ends through which a leg 32 of an L-shaped member passes. The tapered portions of the shims 30 operate in inclined grooves 33 of the wedges 34. By screwing a thumb-nut 35 upon a threaded portion 36 of the other leg 37 of the L-shaped member, said L-shaped member will be drawn through guides 38 carried by the wedge block 39 and all of the shims 30 will be moved in unison and to an equal degree to separate the wedges 34 more or less according to the extent of such movement. The structures of Figs. 13, 14 and 15 are designed to accomplish the same result except that the shims 30ᵃ of said figures are double-pronged, one of the prongs 30ᵇ passing through openings 40 formed in the wedge block 41 and lying in an inclined groove 42 of the corresponding wedge 43. The other prong 30ᶜ engages in an inclined channel 43ᵃ formed in the tail 44 of the wedge 43.

Figure 9:
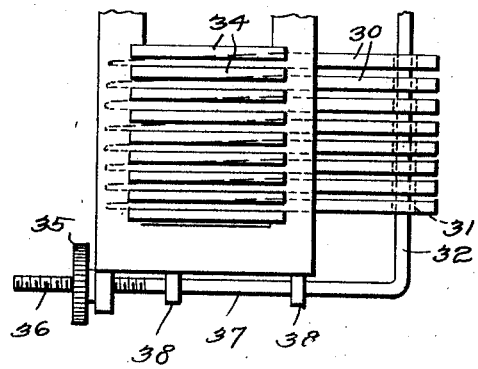
Fig. 9 is a face view of one of the wedge carrying blocks of a modified form of spring spreader illustrating a plurality of simultaneously adjustable shims for separating the wedges from each other.
Figure 10:
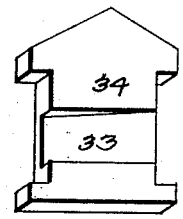
Fig. 10 is a perspective view of one of the wedges used with the structure of Fig. 9.
Figure 11:
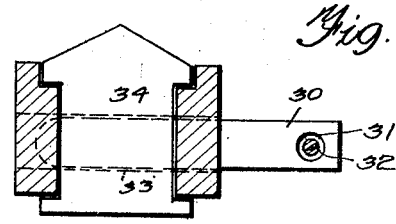
Figure 11 is a horizontal sectional view through the structure of Figure 9.
Figure 12:
Fig. 12 is a side view of one of the wedge shims.

The shims 30ᵃ are provided with openings 30ᵉ for the reception of the leg 32 of an L-shaped member like that illustrated in Fig. 9.

It is to be understood that the invention is not limited to the precise construction set forth, but that it includes within its purview whatever changes come within either the terms or the spirit of the appended claims.

Having described my invention what I claim is:

1. A tool of the character described comprising a pair of blocks, a bank of wedges carried by one of said blocks, threaded bolts on opposite sides of said blocks, threaded means engaging said bolts for moving them forcibly together, means for operating such threaded means simultaneously, one of said blocks being slotted for the reception of one of said bolts, said slot being engaged with the bolt by swinging the block upon the axis constituted by the other of said bolts.

2. A device of the character described comprising a pair of wedge carrying blocks, threaded bolts held against turning with relation to one of said blocks, gear wheels having threaded parts engaged with said bolts and acting against the other of said blocks, a pinion engaged with both of said gear wheels and means carried by said pinion for the reception of an operating tool.

3. A structure as recited in claim 2 in combination with means for floatingly mounting banks of wedges in said blocks.

4. A device of the character described comprising a pair of blocks, each having an elongated opening formed therein, a plurality of wedges in each of said blocks, means for floatingly mounting said wedges with respect to the block by which they are carried, gear wheels having threaded hubs, bolts upon which said gear wheels are threaded, said bolts having angular portions engaged in one of said blocks and a pinion meshing with said gear wheels and having a part adapted to receive an operating tool said gear wheels acting against the other of said blocks.

5. A tool of the character described comprising a pair of blocks each having an elongated opening therein, a series of wedges floatingly mounted in each of said openings, a pair of threaded bolts having angular ends engaged in one of said blocks, the engagement between one end of the last named block and one of said bolts being a detachable engagement, a pair of face plates, a pair of gear wheels and a pinion between said face plates, said pinion meshing with said gear wheels, and said gear wheels being threaded upon said bolts and an operating member upon said pinion, whereby rotation of the pinion may rotate the gear wheels to cause said gear wheels and plates to traverse the bolts and force one of said blocks toward the other.

6. The combination with a body adapted to embrace a vehicle spring and a plurality of wedges of a plurality of tapered shims alternating with said wedges and means for moving all of said shims in unison to cause them to exert a uniform separating action upon the wedges.

7. The combination with a body adapted to embrace a vehicle spring and a plurality of wedges of a plurality of tapered shims alternating with said wedges, a member engaged with all of said shims to move them in unison, and threaded means for adjusting said member.

8. The combination with a plurality of wedges of a plurality of tapered shims alternatinng with said wedges, said shims having aligned openings formed therethrough, an L-shaped member, one leg of which passes through said openings and the other leg of which has a threaded portion, and a threaded member engaged with said threaded portion.

In testimony whereof he affixes his signature in the presence of two witnesses.

GOTTLIEB L. E. KLINGBEIL.

Witnesses:
ROSE S. FRANKEL,
JNO. N. CRAWFORD.